United States Patent
Cohen et al.

(10) Patent No.: US 8,738,778 B2
(45) Date of Patent: May 27, 2014

(54) PEER-TO-PEER DOWNLOAD AND SEED POLICY MANAGEMENT

(75) Inventors: Bram Cohen, Mill Valley, CA (US); Steven Hazel, Berkeley, CA (US); Gregory Hazel, Berkeley, CA (US); David Harrison, San Francisco, CA (US)

(73) Assignee: BitTorrent, Inc., San Francisco, CA (US)

( * ) Notice: Subject to any disclaimer, the term of this patent is extended or adjusted under 35 U.S.C. 154(b) by 211 days.

(21) Appl. No.: 11/740,912

(22) Filed: Apr. 26, 2007

(65) Prior Publication Data
US 2008/0005336 A1 Jan. 3, 2008

Related U.S. Application Data

(60) Provisional application No. 60/745,736, filed on Apr. 26, 2006.

(51) Int. Cl.
*G06F 15/16* (2006.01)

(52) U.S. Cl.
USPC .......................................... 709/227; 709/232

(58) Field of Classification Search
USPC ................................................. 709/227, 232
See application file for complete search history.

(56) References Cited

U.S. PATENT DOCUMENTS

| | | | |
|---|---|---|---|
| 6,741,555 B1 | 5/2004 | Li et al. | |
| 6,760,774 B1 * | 7/2004 | Soumiya et al. | 709/233 |
| 6,870,827 B1 | 3/2005 | Voit et al. | |
| 7,110,995 B2 * | 9/2006 | Kirkland | 1/1 |
| 7,174,385 B2 | 2/2007 | Li | |
| 7,333,487 B2 | 2/2008 | Novaes | |
| 7,440,401 B2 * | 10/2008 | Kang | 370/230.1 |
| 7,706,260 B2 | 4/2010 | Cohen et al. | |
| 2001/0037311 A1 * | 11/2001 | McCoy et al. | 705/65 |
| 2001/0044835 A1 * | 11/2001 | Schober et al. | 709/217 |
| 2002/0035621 A1 * | 3/2002 | Zintel et al. | 709/220 |
| 2002/0099844 A1 * | 7/2002 | Baumann et al. | 709/232 |
| 2002/0112058 A1 * | 8/2002 | Weisman et al. | 709/227 |
| 2002/0161844 A1 * | 10/2002 | Overtoom | 709/208 |
| 2003/0028890 A1 * | 2/2003 | Swart et al. | 725/91 |
| 2003/0050966 A1 * | 3/2003 | Dutta et al. | 709/203 |

(Continued)

OTHER PUBLICATIONS

PCT International Search Report and Written Opinion, PCT/US07/10176, Mar. 20, 2008, 8 Pages.

(Continued)

*Primary Examiner* — Azizul Choudhury
*Assistant Examiner* — Tariq Najee-Ullah
(74) *Attorney, Agent, or Firm* — Fenwick & West LLP

(57) ABSTRACT

Transfer policy management methods in a peer-to-peer networking environment such as BitTorrent are provided. A download TPM maximizes the usage of available bandwidth, while focusing on as few torrents as possible. For a given list of torrents, a peer in accordance with the present invention determines how many download connections to maintain at a given time in order to maximize usage of bandwidth. If the variance of per-connection bandwidths exceeds a threshold, more connections are added until either variance does not exceed the threshold or a maximum number of connections are established. A seeding peer determines when to reduce the number of files being seeded by monitoring its average upload rate per torrent. If its average rate falls below a threshold, then the peer stops seeding a file. The file that the peer stops seeding is one to which the peer is making the smallest overall contribution.

24 Claims, 5 Drawing Sheets

(56) References Cited

U.S. PATENT DOCUMENTS

| | | | |
|---|---|---|---|
| 2003/0055894 A1* | 3/2003 | Yeager et al. | 709/204 |
| 2003/0105831 A1* | 6/2003 | O'Kane | 709/217 |
| 2003/0145093 A1* | 7/2003 | Oren et al. | 709/229 |
| 2003/0163478 A1* | 8/2003 | Kirkland | 707/102 |
| 2004/0143575 A1* | 7/2004 | Cherkasova | 707/10 |
| 2004/0143603 A1* | 7/2004 | Kaufmann et al. | 707/104.1 |
| 2005/0034153 A1* | 2/2005 | Abramson et al. | 725/32 |
| 2005/0157753 A1* | 7/2005 | Mayer | 370/468 |
| 2005/0249226 A1* | 11/2005 | Kang | 370/412 |
| 2005/0267945 A1* | 12/2005 | Cohen et al. | 709/215 |
| 2005/0283537 A1* | 12/2005 | Li et al. | 709/240 |
| 2006/0007947 A1* | 1/2006 | Li et al. | 370/432 |
| 2006/0080454 A1* | 4/2006 | Li | 709/231 |
| 2006/0122898 A1* | 6/2006 | Andersen et al. | 705/26 |
| 2006/0159020 A1* | 7/2006 | Porat | 370/235 |
| 2006/0182128 A1* | 8/2006 | Nakata et al. | 370/401 |
| 2006/0200736 A1* | 9/2006 | Smit et al. | 715/500 |
| 2007/0174471 A1* | 7/2007 | Van Rossum | 709/229 |
| 2007/0280255 A1* | 12/2007 | Tsang et al. | 370/395.2 |
| 2008/0155120 A1* | 6/2008 | Argawal et al. | 709/242 |
| 2008/0177994 A1* | 7/2008 | Mayer | 713/2 |
| 2008/0189429 A1* | 8/2008 | DaCosta | 709/231 |
| 2009/0037968 A1* | 2/2009 | Liu et al. | 725/114 |
| 2010/0142376 A1* | 6/2010 | Lou et al. | 370/236 |

OTHER PUBLICATIONS

PCT International Search Report and Written Opinion, PCT/US07/10294, Jun. 16, 2008, 8 Pages.

\* cited by examiner

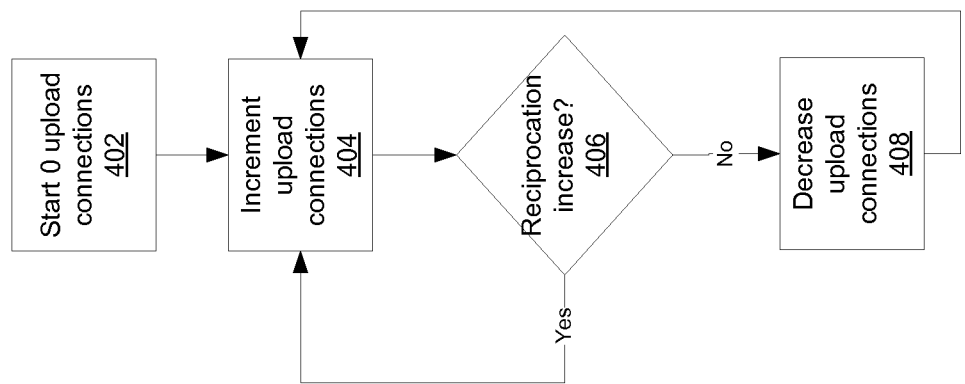

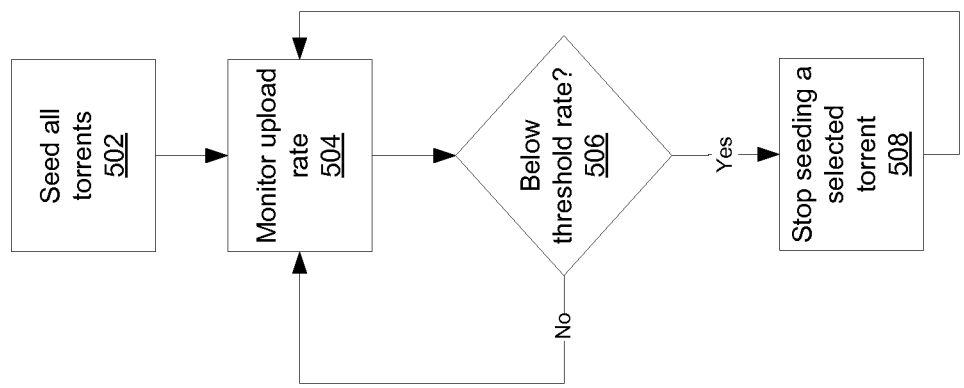

PEER-TO-PEER DOWNLOAD AND SEED POLICY MANAGEMENT

CROSS-REFERENCE TO RELATED APPLICATIONS

This application claims the benefit of provisional application 60/745,736, filed on Apr. 26, 2006, and which is incorporated by reference herein in its entirety.

BACKGROUND OF THE INVENTION

1. Field of the Invention

The present invention is related generally to peer-to-peer file transfers. In particular, the present invention is directed toward download policy and seed policy management in a peer-to-peer environment.

2. Description of Background Art

A peer-to-peer (P2P) network is one in which client computers exchange information with other client computers (also known as nodes) without the need for a server acting as an intermediary. P2P networks are frequently used to allow nodes to exchange files. A node that provides a file for downloading by other nodes is known as a seed for that file, and other nodes establish a connection to the seed to obtain the file. In some P2P environments, a file is obtained by a node from a plurality of other nodes, rather than from a single seed.

Each node in the P2P network is typically responsible for determining how much of its available bandwidth to allocate for downloading. Conventional approaches include downloading all desired files simultaneously, or downloading a predetermined maximum number of files simultaneously. However, these approaches do not use bandwidth in an efficient manner.

A node acting as a seed for one or more files must also determine when it should stop acting as a seed for each file, in order to maximize efficient use of bandwidth.

Conventional approaches include seeding all files simultaneously; simultaneously seeding a fixed number of available files; seeding only those files which were received after a certain fixed time horizon, e.g., within the last 24 hours; or simultaneously seeding only those files for which the seed has sent a total amount of data less than some fixed percentage of the file, e.g., upload up to 200% of the size of the file, and then stop. Again, these approaches have not led to an efficient use of bandwidth.

SUMMARY OF THE INVENTION

The present invention enables transfer policy management (TPM) methods in a peer-to-peer networking environment such as BitTorrent.

A described download TPM maximizes the usage of available bandwidth, while focusing on as few torrents as possible. For a given list of torrents, a peer in accordance with the present invention determines how many download connections to maintain at a given time in order to maximize usage of bandwidth. If the variance of per-connection bandwidths exceeds a threshold, more connections are added until either variance does not exceed the threshold or a maximum number of connections are established.

A seeding peer determines when to reduce the number of files being seeded by monitoring its average upload rate per torrent. If its average rate falls below a threshold, then the peer stops seeding a file. The file that the peer stops seeding is one to which the peer is making the smallest overall contribution.

BRIEF DESCRIPTION OF THE DRAWINGS

FIG. 4 illustrates an alternative method for download transfer policy management in accordance with an embodiment of the present invention.

FIG. 5 illustrates a method for seeding transfer policy management in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

One peer-to-peer protocol is the BitTorrent protocol. In the BitTorrent protocol, a peer shares a file by creating a torrent. A torrent is itself a file that comprises data about the file to be shared as well as the location of a tracker. The torrent file is typically distributed, e.g., by being posted on a web site, and is obtained by peers seeking to obtain the original file. When a peer obtains the torrent file, the peer examines the torrent to identify the location of the tracker. The peer then contacts the tracker, which tells the peer where to find the seed for the file. A group of peers connected to each other to share a torrent is known as a swarm.

Figure 1:
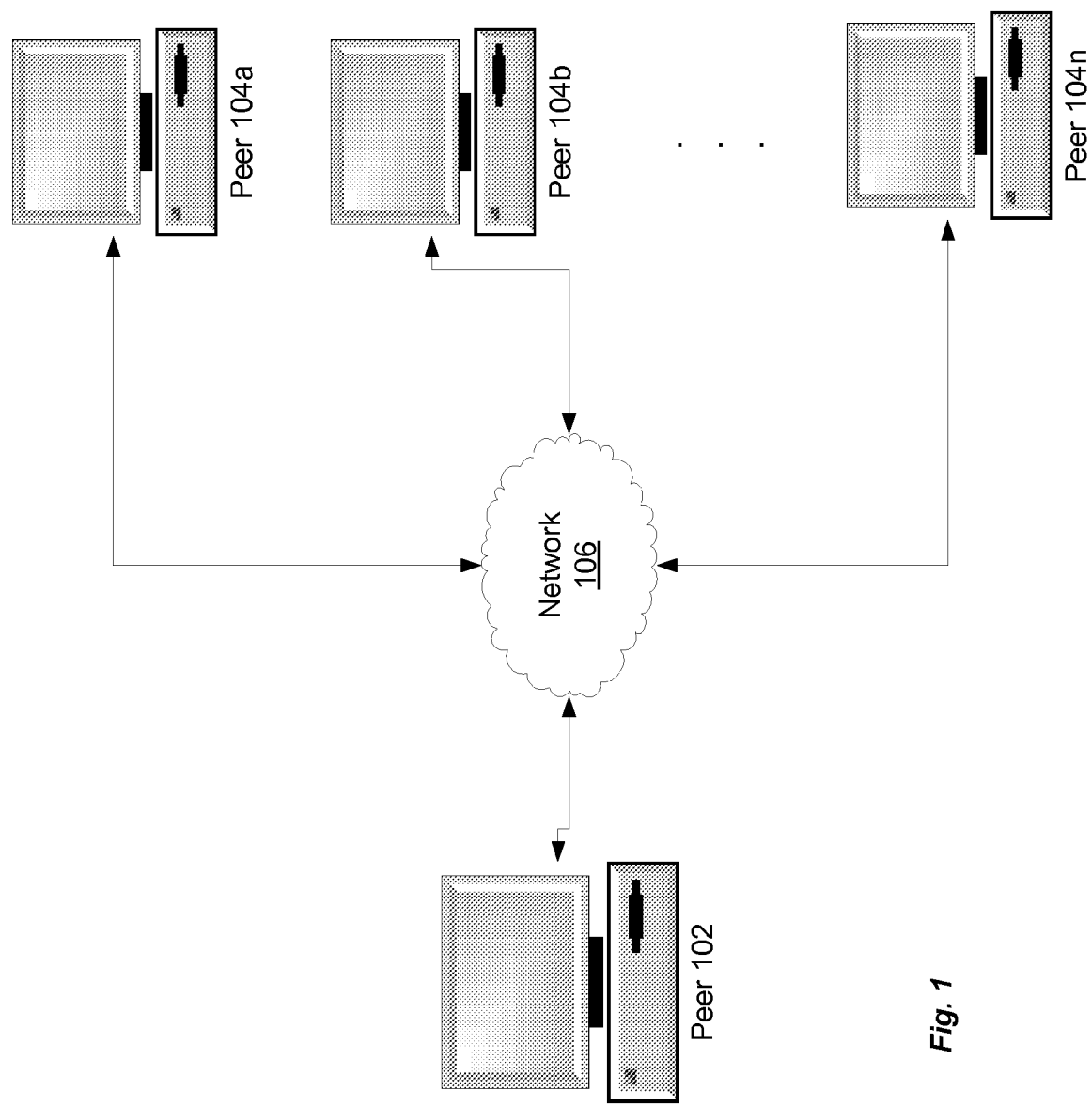
FIG. 1 illustrates a swarm in accordance with an embodiment of the present invention.

FIG. 1 illustrates a swarm in accordance with an embodiment of the present invention. Peer 102 is downloading files from peers 104a, 104b, . . . , 104n via a network 106.

Download Transfer Policy Management

Figure 2:
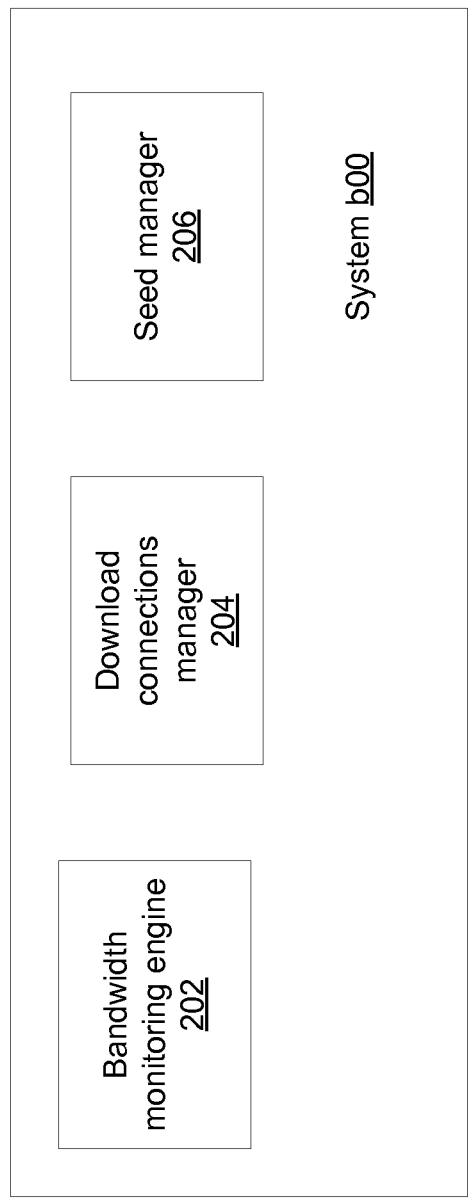
FIG. 2 illustrates a system for transfer policy management in accordance with an embodiment of the present invention.

FIG. 2 illustrates a system 200 for transfer policy management in accordance with an embodiment of the present invention. System 200 in one embodiment is a software application that is executed as part of or in conjunction with the P2P protocol on peer 102. System 200 includes a bandwidth monitoring engine 202, a download connections manager 204, and a seed manager 206. The operation of each component is explained further below.

Figure 3:
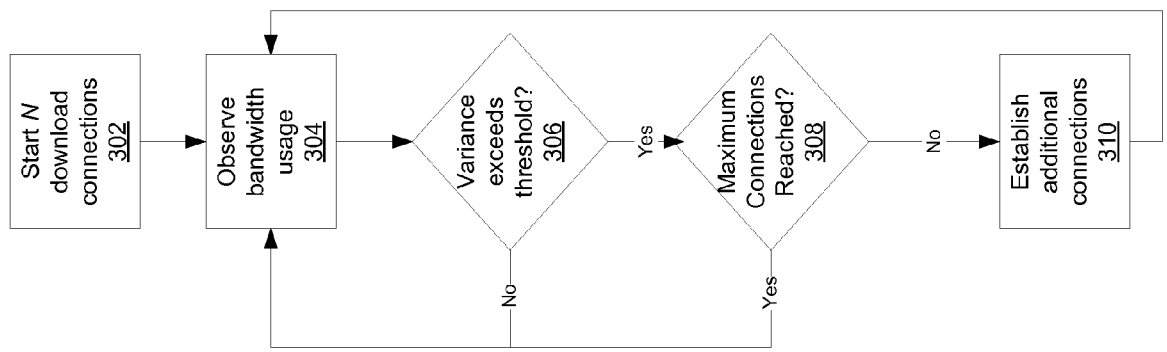
FIG. 3 illustrates a method for download transfer policy management in accordance with an embodiment of the present invention.

A method for download transfer policy management in accordance with an embodiment of the present invention is described with reference to FIG. 3. Each torrent download has a variable number of connections to peers. Initially, peer 102 starts 302 some number, N, of initial download connections, which in one embodiment is small enough to not consume all available download bandwidth, but large enough to collect network statistics that are diversified across the individual characteristics of particular transfers. In one embodiment, N is chosen based on the typical ratio of download to upload bandwidth offered by consumer ISPs. Alternatively, N can be less precisely specified, by instead choosing a number of torrents to start, M, so that N is roughly M times the average number of connections per torrent; or N can be specified by a user.

Once the N connections are active, their bandwidth usage is observed 304 by bandwidth monitoring engine 202. If 306 the variance of observed per-connection bandwidths exceeds some threshold, X, for some span of time, T, downloads connections manager 204 attempts to establish 310 more connections, potentially by starting more torrents. This is based on the observation that fully-saturated channels typically balance bandwidth more evenly across connections than channels with bandwidth to spare. X and T may be chosen based on experimental data, and in one embodiment T is 60 seconds and X is 0.75. In one embodiment, as illustrated in FIG. 3, a check is made 308 to determine whether a maximum number of active connections has already been reached, prior to establishing additional connections.

As an alternative to maximizing the usage of available downstream bandwidth as described above, and referring to FIG. 4, an optimization can instead be performed on allocation of available upstream bandwidth. In one embodiment, a peer 102 accepts as much data for download as is offered to it, but limits the number of connections on which it uploads data. In protocols such as the BitTorrent protocol that limit a download rate based on the client's upload rate, this method indirectly limits the download rate.

In such an embodiment, peer 102 begins by uploading 402 data on zero connections, and periodically increments 404 the number of connections to which it uploads. This continues for as long as the client's reciprocation increases 406. Reciprocation is the number of bytes downloaded granted for each bite uploaded. If reciprocation decreases, peer 102 reduces 408 the number of connections to which it uploads.

Seeding Transfer Policy Management

When seeding multiple files, a peer 102 must decide which and how many files to seed at any given time, assuming that the peer 102 has more than one file it can seed. Ideally, the selection of files to seed should result in the greatest amount of available bandwidth being used, and the greatest overall file availability being achieved.

Referring to FIG. 5, a peer 102 in one embodiment begins by seeding 502 all of the torrents it has available to seed, and subsequently determines when to stop seeding one of them, and which one to stop seeding. In one embodiment, the criteria for whether to stop seeding a torrent is based on the average upload rate for all connections on all seeded torrents. Seed manager 206 monitors 504 the average upload rate. If 506 the average upload rate drops below a minimum threshold, T, seed manager 206 stops 508 seeding a torrent, as selected by one of the criteria below. It is advantageous from an efficiency perspective to choose to stop seeding the torrent to which the client is making the least valuable contribution.

There are at least three criteria that can be used to determine which seed to stop seeding once the average upload rate falls below the specified threshold.

In the BitTorrent protocol, each peer 104a, 104b, . . . , 104n reports its total download rate—that is, the sum of all download rates on all connections for the torrent in question—to all other peers on the torrent, including the seeding peer 102. In one embodiment, the torrent that peer 102 selects to stop seeding is the torrent for which the peer's upload rate accounts for the smallest percentage of the total download rate reported by peers to which it is uploading.

In an alternative embodiment, the torrent to stop seeding is the one for which the most complete copies exist in the network, relative to the number of peers downloading the file. Each peer has knowledge of only a limited portion of the peers involved in any particular torrent, so this calculation is based on the limited knowledge of the peers.

In another alternative embodiment, peers attempt to maintain an even distribution of pieces in the network. For example, in the BitTorrent protocol, peers typically download pieces in random order, or will download rarer pieces sooner, in order to keep any one piece from becoming more common than another. As a result, where multiple complete copies of a file exist on the network, the distribution of pieces held by a given peer will be close to random, and the correlation of one peer's pieces with another client's will be low. If, however, the correlation is high, this indicates that some pieces are hard to find. Accordingly, the file that seeding peer 102 stops seeding is the one for which the correlation between the piece inventories of peers to whom the seeding peer 102 is uploading is lowest.

Note that the methods described above for determining when to stop seeding a file apply equally to a peer 102 that is uploading only a portion of a file—that is, peer 102 may not have all pieces of a file, and therefore is not classified as a seed, but may nonetheless upload to other peers th pieces it does have. The methods described above for efficient use of bandwidth in the seeding context apply as well to the general case of uploading only portions of a file.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the networking and data transfer arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality. It should be borne in mind, however, that all of these and similar terms are to be associated with the appropriate physical quantities and are merely convenient labels applied to these quantities.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method for downloading files in a peer-to-peer environment, the method comprising:
    establishing, by a downloading peer, a plurality of connections with a plurality of peers over a peer-to-peer network, each of the plurality of peers having at least a portion of a file;
    receiving, by the downloading peer, portions of the file from the plurality of peers to which the downloading peer is connected;
    calculating a statistical variance of bandwidth usage for the plurality of connections based on bandwidth usage of each of the plurality of connections
    responsive to the calculated statistical variance of bandwidth usage for the plurality of connections exceeding a threshold, establishing a connection in addition to the plurality of connections, the additional connection between the downloading peer and an additional peer having at least a portion of the file; and
    receiving a portion of the file from the additional peer.

2. The method of claim 1, wherein a number of the plurality of connections is based on a ratio of available download bandwidth to available upload bandwidth.

3. The method of claim 1, wherein a number of the plurality of connections corresponds to an amount of associated torrents.

4. The method of claim 1, wherein establishing the additional connection further comprises:
    determining a time interval for which the statistical variance of bandwidth usage for the plurality of connections has exceeded the threshold; and
    responsive to the time interval exceeding a specified duration, establishing the additional connection.

5. The method of claim 1, wherein establishing the additional connection further comprises
    determining a number of the plurality of connections; and
    responsive to the number of the plurality of connections being less than a maximum number, establishing the additional connection.

6. A computer system for downloading files in a peer-to-peer environment, the computer system comprising:
    a non-transitory computer-readable storage medium storing computer executable instructions, the instructions comprising:
    a download connections manager adapted to:
        establish a plurality of connections between a downloading peer and a plurality of peers having at least a portion of a file;
        receive portions of the file from the plurality of peers to which the downloading peer is connected; and
    a bandwidth monitoring engine adapted to:
        calculate a statistical variance of bandwidth usage for the plurality of connections based on bandwidth usage of each of the plurality of connections; and
        instruct the download connections manager to establish a connection in addition to the plurality of connection, the additional connection between the downloading peer and an additional peer having at least a portion of the file in response to the calculated statistical variance of bandwidth usage for the plurality of connections exceeding a threshold, the download connections manager receiving a portion of the file from the additional peer; and
    a computer processor configured to execute the instructions.

7. The computer system of claim 6, wherein a number of the plurality of connections is based on a ratio of available download bandwidth to available upload bandwidth.

8. The computer system of claim 6, wherein a number of the plurality of connections corresponds to an amount of associated torrents.

9. The computer system of claim 6, wherein a number of the plurality of connections is specified by a user.

10. The computer system of claim 6, wherein establishing the additional connection further comprises:
    determining a time interval for which the statistical variance of bandwidth usage for the plurality of connections has exceeded the threshold; and
    responsive to the time interval exceeding a specified duration, establishing the additional connection.

11. The computer system of claim 6, wherein establishing the additional connection further comprises
    determining a number of the plurality of connections; and
    responsive to the number of the plurality of connections being less than a maximum number, establishing the additional connection.

12. A method for uploading files in a peer-to-peer environment, the method comprising:
    providing, by an uploading peer, a plurality of files to a plurality of peers in a peer-to-peer network;
    determining an average upload rate at which the plurality of files are provided to the plurality of peers;
    responsive to the average upload rate being less than a threshold rate, selecting from the plurality of files, a file to stop providing to the plurality of peers based on a number of complete copies of the file in the peer-to-peer network;
and ceasing to provide to the plurality of peers the selected file from the plurality of files.

13. The method of claim 12, wherein selecting the file to stop providing further comprises:
    for each of the plurality of files, determining a number of complete copies included in the peer-to-peer network; and ceasing to provide the selected file based on the selected file having the highest number of complete copies in the peer-to-peer network.

14. A method for uploading data in a peer-to-peer environment, the method comprising:
uploading data to an initial number of connections, each connection between an uploading peer and one of a plurality of peers;
uploading data to a first additional connection between the uploading peer and one of the plurality of peers;
determining a change in reciprocation responsive to uploading data to the additional connection, wherein reciprocation is a number of bytes granted to the uploading peer for download based on a number of bytes uploaded by the uploading peer; and
responsive to the change in reciprocation being an increase, establishing a second additional connection between the uploading peer and one of the plurality of peers and uploading data through the second additional connection.

15. The method of claim 14, further comprising:
responsive to the change in reciprocation being a decrease, ceasing to upload data to one of the connections between the uploading peer and one of the plurality of peers.

16. A computer system for uploading files in a peer-to-peer environment, the system comprising:
a non-transitory computer-readable storage medium storing computer executable instructions, the instructions comprising:
an upload connections manager adapted to:
upload data to an initial number of connections, each connection between a first peer and one of a plurality of peers; and
upload data to a first additional connection between the first peer and one of the plurality of peers; and
a bandwidth monitoring engine adapted to:
determine a change in reciprocation responsive to uploading data to the first additional connection, wherein reciprocation is a number of bytes granted to the first peer for download based on a number of bytes uploaded by the first peer; and
responsive to the change in reciprocation being an increase, establishing a second additional connection between the first peer and one of the plurality of peers and uploading data through the second additional connection; and
a computer processor configured to execute the instructions.

17. The computer system of claim 16, wherein the upload connections manager is further adapted to:
responsive to a the change in reciprocation being a decrease, cease to upload data to one of the connections between the first peer and one of the plurality of peers.

18. A system for uploading files in a peer-to-peer environment, the system comprising:
a non-transitory computer-readable storage medium storing computer executable instructions, the instructions comprising: a seed manager adapted to provide a plurality of files from an uploading peer to a plurality of peers in a peer-to-peer network; and
a bandwidth monitoring engine adapted to:
determine an average upload rate at which the plurality of files are provided to the plurality of peers;
responsive to the average upload rate being less than a threshold rate, select from the plurality of files, a file to stop providing to the plurality of peers based on a number of complete copies of the file in the peer-to-peer network; and
cease to provide to the plurality of peers the selected file from the plurality of files; and
a computer processor configured to execute the instructions.

19. The computer system of claim 18, wherein selecting The file to stop providing further comprises:
for each of the plurality of files, determining a number of complete copies included in the peer-to-peer network; and
ceasing to provide the selected file based on the selected file having the highest number of complete copies in the peer-to-peer network.

20. A method for uploading files in a peer-to-peer environment, the method comprising:
providing, by an uploading peer, a plurality of files to a plurality of peers in a peer-to-peer network;
determining an average upload rate at which the plurality of files are provided to the plurality of peers;
responsive to the average upload rate being less than a threshold rate, selecting from the plurality of files, a file to stop providing to the plurality of peers based on a correlation between a first inventory of pieces of the file in the uploading peer and a second inventory of pieces of the file in the peer-to-peer network; and
ceasing to provide to the plurality of peers the selected file from the plurality of files.

21. The method of claim 20, wherein selecting the file to stop providing further comprises:
for each of the plurality of files, determining a first inventory of file pieces included in uploading peer;
for each of the plurality of files, determining a second inventory of file pieces included in the peer-to-peer network;
for each of the first plurality of files, calculating a correlation between the first inventory and the second inventory; and
ceasing to provide the selected file based on the selected file having the lowest calculated correlation.

22. A method for uploading files in a peer-to-peer environment, the method comprising:
providing, by an uploading peer, a plurality of files to a plurality of peers in a peer-to-peer network;
determining an average upload rate at which the plurality of files are provided to the plurality of peers;
responsive to the average upload rate being less than a threshold rate, selecting from the plurality of files, a file to stop providing to the plurality of peers based on an uploading rate at which the uploading peer uploads the file and a total download rate of the file by peers downloading the file; and
ceasing to provide to the plurality of peers the selected file from the plurality of files.

23. The method of claim 22, wherein the selection of the file is further based on the upload rate at which the uploading peer uploads the file being the smallest percentage of the total download rate of the file.

24. The method of claim 22, wherein selecting the file to stop providing further comprises:
for each of the plurality of files, determining a total download rate for the peer-to-peer network;
for each of the plurality of files, determining an upload rate for the uploading peer;
for each of the plurality of files, calculating a percentage of the total download rate for the peer-to-peer environment represented by the upload rate for a first peer; and ceasing to provide the selected file based on the selected file having the lowest calculated percentage.

* * * * *